United States Patent [19]

Matheny

[11] Patent Number: 5,315,645
[45] Date of Patent: May 24, 1994

[54] COMMUNICATION APPARATUS UTILIZING DIGITAL OPTICAL SIGNALS

[75] Inventor: Mark Matheny, Manchester, Conn.

[73] Assignee: Tek Electronics Manufacturing Corporation, Manchester, Conn.

[21] Appl. No.: 624,983

[22] Filed: Dec. 10, 1990

[51] Int. Cl.⁵ .................. H04B 9/00; H04M 17/00
[52] U.S. Cl. ..................... 379/144; 379/155; 379/56
[58] Field of Search .................. 379/144, 56, 58, 61, 379/155; 455/600, 613, 617, 608

[56] References Cited

U.S. PATENT DOCUMENTS 4,862,166  8/1989  Yamakawa ............... 341/34 X
4,921,468  5/1990  Miwa ........................ 455/617

*Primary Examiner*—Stephen Chin
*Assistant Examiner*—Paul Loomis
*Attorney, Agent, or Firm*—McCormick, Paulding & Huber

[57] ABSTRACT

Communication apparatus using baseband, digitally formatted optical signals provides an infrared optical communication link between a terminal unit and station unit. Pulse width modulation or continuously variable slope delta modulation digital procotols are used to encode and decode the transmitted and received digital optical signals. A microprocessor senses the presence of a connection command signal to complete the optical communication link. In one embodiment of the invention, a station unit associated with a coin operated type pay telephone instrument communicates with a remotely located terminal unit to permit a user to access and be connected to the public telephone network via the terminal unit. The station unit senses the digitally formatted optical signal and decodes it to derive the supervisory and audio frequency signals and in response to the supervisory signals causes the telephone line to be connected to and disconnected from the station unit. Electrical signals from the telephone line are digitally encoded and transmitted via the optical communication link as baseband digitally formatted optical signals to the terminal unit where they are sensed, converted to electrical digital pulses, decoded and transformed to an analog signal to excite a transducer to produce an audible signal corresponding to the audio signal on the telephone line.

27 Claims, 7 Drawing Sheets

COMMUNICATION APPARATUS UTILIZING DIGITAL OPTICAL SIGNALS

BACKGROUND OF THE INVENTION

The present invention relates generally to optically coupled communication apparatus comprising a terminal unit and station unit located remotely from one another and deals more particularly with communication apparatus utlizing baseband digitally formatted optical signals to establish a two-way optical communication link between a terminal unit and a station unit. The invention also deals specifically with communication on the public telephone network wherein a user via a remote, portable, terminal unit establishes a two-way digitally formatted optical communication link with a coin operated pay telephone instrument and the like equipped with the station unit of the invention.

Telephonic communications via the public telephone network has grown substantially over the past few years as the numbers of the traveling public become larger and as more and more people become reliant on the ability to communicate with others to gain their livelihood, such as, for example, salesmen and the like. Such communication is generally accomplished utilizing the so called pay or coin operated telephone instrument and includes credit card and the like type operated telephone instruments. In order to meet the increased demand for access to the public telephone network, the so called cellular type telephone service was introduced wherein a user is assigned a dedicated telephone number and may originate and receive telephone calls by means of a cellular type telephone instrument cooperating with a mobile radio receiver. Although cellular type telephone service permits a user to place and receive a call from any location within a cellular area from his own cellular telephone, cellular telephone instruments and cellular telephone service are relatively expensive and in some instances not available in all geographic locations. Accordingly, the majority of telephone callers still access the public telephone network via conventional coin operated, credit card and the like type telephone instruments.

Applicant's U.S. Pat. No. 4,829,561, assigned to the same assignee as the present invention and incorporated herein by reference, discloses apparatus for optically coupling a terminal unit to the public telephone network through a pay telephone instrument and the like wherein the optical communication link is established by the "brute force" transmission of baseband audio frequency signals that have been converted to an energy beam typically an infra-red optical signal. The device of the above-referenced patent utilizes baseband analog techniques and is susceptible to the limitations and problems generally associated with any device utilizing analog baseband frequency operation.

The aim therefore of the present invention is to provide communication apparatus utilizing a digital communications protocol to generate a digitally formatted optical signal to provide a two-way communication link between a terminal unit and a station unit located remotely from and in line-of-sight alignment with one another.

It is a further object of the present invention to provide a telephonic device that is portable and personal to a user and which permits access to the public telephone network while overcoming disadvantages associated with conventional coin-operated operated, credit card and the like type telephone instruments.

SUMMARY OF THE INVENTION

In accordance with the present invention, communication apparatus and a related method utilizing digital optical signals for establishing a bi-directional optical communication path between a first and second location remote from one another is presented. An analog signal representative of for example, voice, is converted by a digital modulator to a digital electrical signal to drive an optical transmission circuit to generate and transmit a baseband digitally formatted optical signal. An optical receiving circuit is located remotely from the optical transmission circuit and in line-of-sight alignment to sense and receive the baseband digitally formatted signal. The received digitally formatted optical signal is converted by a digital demodulator to an analog electrical signal replicating the input analog electrical signal.

The invention further comprises a second circuit for receiving an input analog electrical signal which is processed by a digital modulator to a digital electrical signal to drive an optical transmission circuit which generates and transmits a second baseband digitally formatted optical signal. The second baseband digitally formatted optical signal is sent to the first location to complete a bi-directional optical communication path preferably utilizing infrared optical signals. The received second baseband digitally formatted optical signal is processed by a digital demodulator to generate a fourth analog signal replicating the third analog input signal.

In a further embodiment of the invention, apparatus for establishing a bi-directional optical communication path between a user and a telephone switching network is presented in combination with a telephone instrument of the general type arranged with coin, credit card and the like for accessing connection to the public telephone switching network. A station unit electrically interfaces a telephone line associated with the public telephone switching network and the telephone instrument and has two operative states corresponding to the telephone line being electrically connected to the telephone instrument in the normal manner and corresponding to the telephone line being electrically connected to the station unit, respectively. A terminal unit is located remotely from the station unit and transmits digitally formatted optical signals representative of voice or other audio signals present at the terminal unit in audible form which are transformed by a microphone into an analog electrical signal. The analog signal and supervisory signals which are generated from a keypad utilizing dual tone multifrequency (DTMF) signals representative of supervisory signals and telephone number digits are processed by a digital modulator and converted to digital electrical signals which drive LED's or other optical devices to generate the digitally formatted optical signals which are transmitted to the station unit. An optical receiver at the station unit senses the transmitted optical signals and converts them to digital electrical signals which are processed by a digital decoder into analog electrical signals. The analog signals are coupled to the telephone line and replicate the electrical signal representative of the audible input at the terminal unit.

A further aspect of the invention utilizes a microprocessor circuit to sense the presence of a digital electrical signal having a predetermined frequency to initiate a connection with the terminal unit. The microprocessor then enables an optical transmitter at the station unit to transmit a digitally formatted optical signal to the terminal unit to establish the bi-directional optical communication path over which electrical analog signals present at the telephone line are transmitted a digitally formatted optical signals to the terminal unit. The digital optical signals are sensed and decoded by a digital demodulator, converted to an analog electrical signal and transformed via an earpiece to an audible signal heard by the user.

In a further aspect of the invention, a voice synthesis message circuit is controlled by the microprocessor and provides instructional messages, advertisements and the like to the user during the calling sequence.

In a yet further aspect of the invention, the microprocessor maintains the connection to the telephone line for a predetermined time during which the optical communication link between the terminal unit and station unit is broken or interrupted before dropping the connection to the telephone line. This feature compensates for momentary interruptions of the continuous transmission of digitally formatted optical signals at the predetermined frequency due to people breaking the optical communication link by walking through or by other objects interfering with the path which prevents the terminal unit and station unit to be in line-of-sight alignment.

BRIEF DESCRIPTION OF THE DRAWINGS

Additional objects, features and advantages of the present invention will become readily apparent from the following written description and claims taken in conjunction with the drawings wherein:

DETAILED DESCRIPTION OF THE PREFERRED EMBODIMENTS

Prior to describing several preferred embodiments, it will be recognized that the present invention may be utilized in any environment to provide a communication link between two remote locations wherein a digitally formatted optical signal is transmitted at baseband to carry information over the optical communication link between the two locations. Transmission of the digitally formatted optical signal at baseband means the transmission is made without using a carrier signal and further there is only one transmission channel. Such a two way optical communication link might be, for example, between two buildings, between two locations within the interior of a building, between remote locations outdoors, or between any two remote locations wherein a line-of-sight alignment is possible. Several preferred embodiments are described hereinbelow by way of example rather than limitation.

Figure 1:
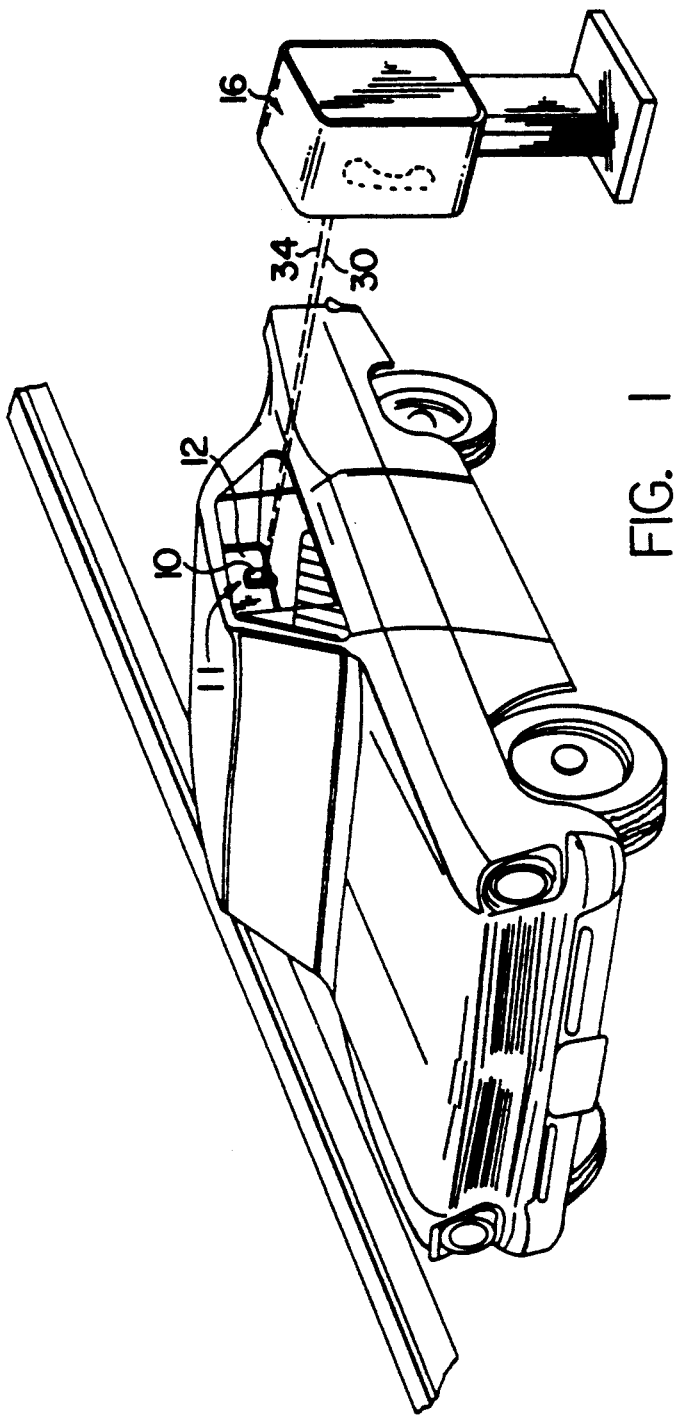
FIG. 1 is a perspective, somewhat conceptual illustration showing the transmitter portion of the terminal unit of the invention attached to an automobile visor and aimed in the vicinity of the station unit of the invention arranged to cooperate with a pay telephone.
Figure 2:
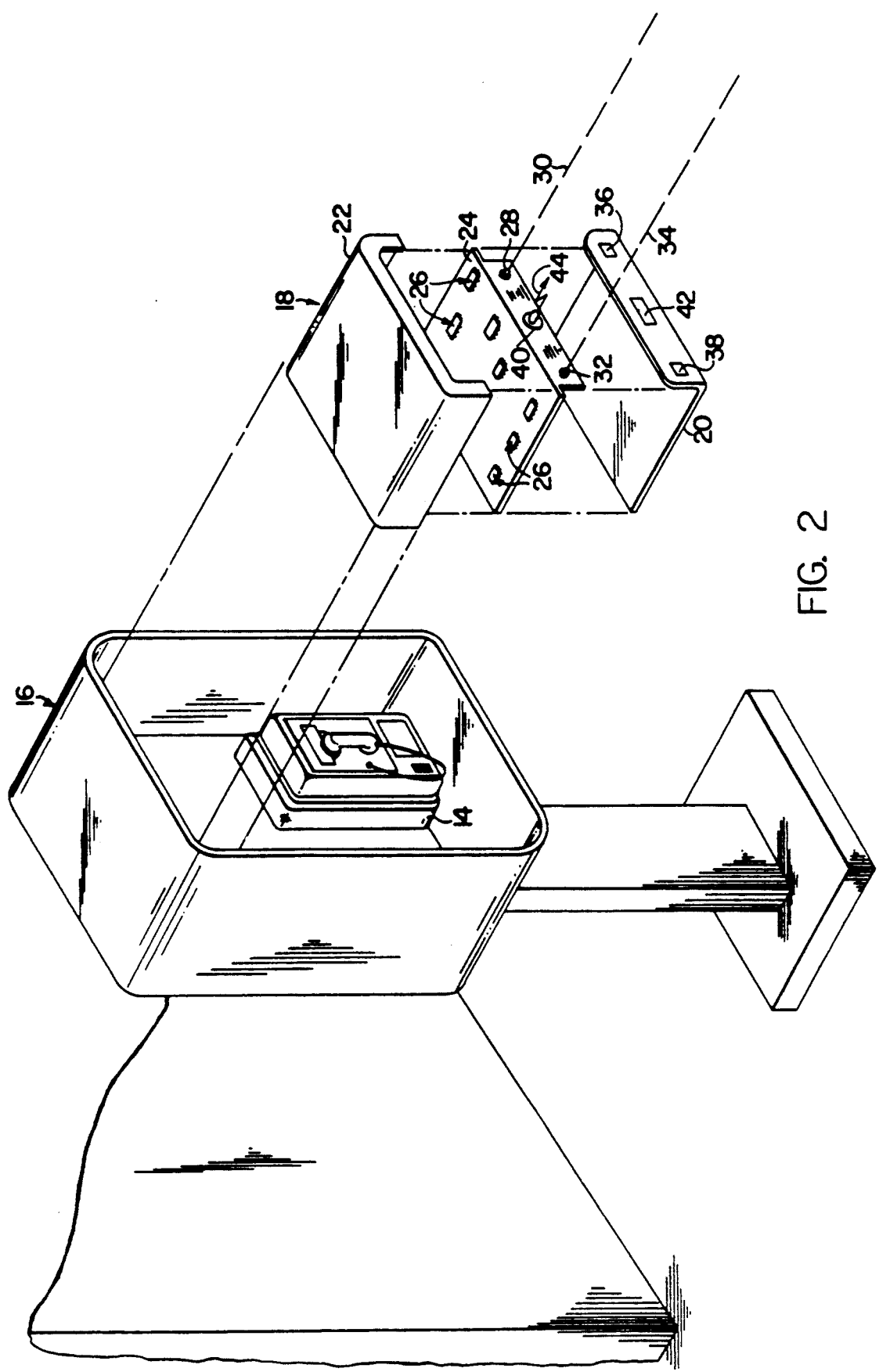
FIG. 2 is a somewhat perspective, exploded view of the station unit embodying the present invention showing one possible mounting arrangement with the pay telephone.

Turning now to the drawings and considering FIGS. 1 and 2, the present invention is disclosed in one embodiment in combination with a telephone instrument of the general type arranged to accept coin, credit card, and the like for accessing a connection to the public telephone switching network.

FIG. 1 illustrates the receiver/transmitter unit portion 10 of a terminal unit 11 embodying the present invention wherein the receiver/transmitter unit 10 is mounted on a visor 12 of an automobile and oriented such that the receiver/transmitter unit 10 is aimed generally in the direction of a station unit which receives the digitally formatted optical signals and interfaces with a coin operated pay type telephone instrument as best viewed in FIG. 2.

In FIG. 2, the coin operated pay type telephone instrument is designated 14 and is mounted in a typical telephone enclosure unit generally designated 16. The station unit portion is generally designated 18 and is shown in a slightly exploded view. The station unit 18, in one embodiment, includes a base 20 and cover 22 which provide means for mounting and enclosing an electronic circuit board 24 upon which circuit board are mounted electronic components, relays, connectors, integrated circuits, etc. generally designated for illustrative purposes 26,26 and which comprise the electronic circuitry of the station unit.

The circuit board 24 also includes one or more optical devices such as, light emitting diodes (LED) 28 for generating an energy beam, for example, an optical beam 30. The station unit 18 also includes at least one optical sensing and detecting device such as a photo diode 32 for receiving an energy beam, for example, an optical beam 34 originating at and being transmitted from the receiver/transmitter unit 10. Typically, the station unit 18 may also include optical filters 36 and 38 through which the optical beams 30 and 34, respectively, pass. The optical filter serves to limit the energy sensed by the photo diode and which energy is in the form of visible or ambient light which may tend to degrade the optical signal transmitted and received between the terminal unit and station unit.

The circuit board 24 includes a visual indicator or lamp 40 which functions as a target and illuminates to alert a user that the receiver/transmitter unit 10 is aimed and oriented correctly to establish and maintain the two way optical communication link between the receiver/transmitter unit 10 and the station unit 18. The target lamp 40 is illustrated in FIG. 2 in alignment with an opening 42 in the base 20 and through which opening the visual target indicating light beam 44 may be seen by the user.

Figure 3:
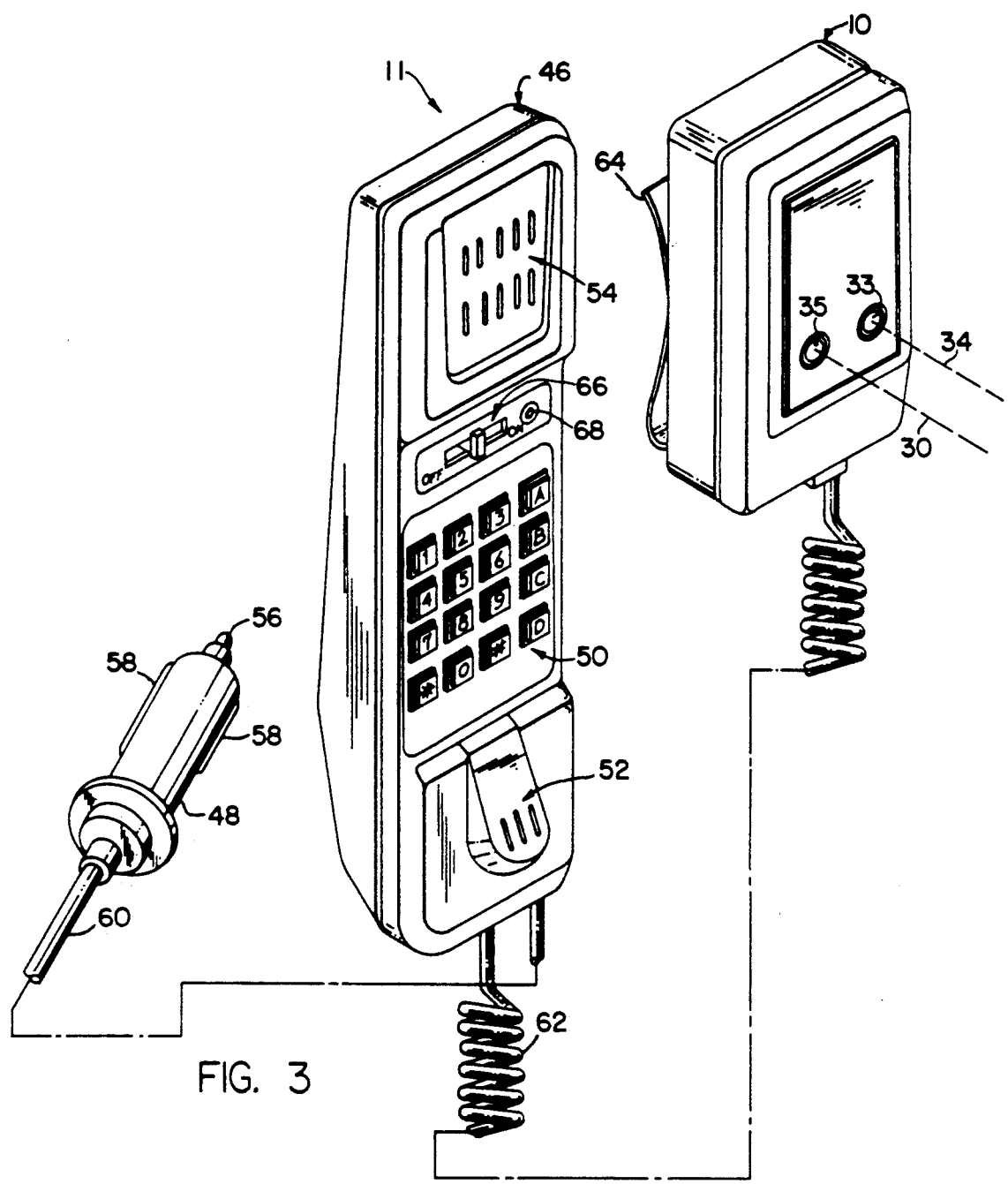
FIG. 3 is a somewhat perspective view of the terminal unit embodying the present invention wherein the digitally formatted optical signal receiver/transmitter unit is separate from the handset containing the earpiece, microphone and keypad.

Turning now to FIG. 3, one embodiment of the terminal unit 11 is shown wherein the terminal unit 11 includes a handset generally designated 46, a receiver/transmitter unit generally designated 10, and a power plug generally designated 48. The handset 46 comprises a keypad generally designated 50, a microphone built into the handset and generally designated 52, and an earphone generally designated 54 also built into the handset. The power required for the electronic circuitry within the handset 46 and the receiver/transmitter unit 10 is supplied from a power plug 48 adapted to be inserted into the cigarette lighter receptacle in the case of a terminal unit designed for use with a vehicle. Typically, a battery voltage potential from the battery of the vehicle is applied at the tip 56 and ground reference potential is applied to the side terminals 58,58 of the power plug 48. Both the battery voltage potential and the ground reference potential are connected to corresponding electrical wires within an electrical conduit 60 and which wires carry the voltage and ground reference potentials from the power plug 48 to the handset 10. The handset 10 is in turn connected via wires within an electrical conductor or sheath 62 to the receiver/transmitter unit 10. It will be recognized by those skilled in the art that power for the handset 46 and receiver/transmitter unit 10 may be supplied by well known power source means other than the vehicle battery.

The receiver/transmitter unit 10 includes, in the illustrated embodiment, a visor clip 64 for attaching the receiver/transmitter 10 to the visor of a vehicle as illustrated in FIG. 1. The receiver/transmitter unit 10 also generates, as illustrated schematically in FIGS. 1 and 4, optical beam 34 produced by one or more light emitting diodes (LED) located behind an optical filter 33. The receiver/transmitter unit 10 also includes optical detector devices located behind an optical filter 35 for sensing and detecting an optical beam 30 produced by the station unit located remotely from the terminal unit and which station unit is not illustrated in FIG. 3. It will be understood that the handset 46 and the receiver/transmitter unit 10 may be packaged as a single integral unit and may also include an internally housed battery. For example, the terminal unit 11 may be packaged to be fit into a user's briefcase and to operate with a station unit at a pay telephone instrument located in an airport, railroad station, or other such area where pay telephone instruments are generally located.

As explained and described in further detail below, an initiate communication link or connection command is generated at the handset by operating a switch generally designated 66 from an OFF position to an ON position to activate the electronic circuitry generating the initiate communication link or connection command signal which is transmitted to the station unit via the optical beam. The handset may also include an indicator, such as an LED 68, to alert the user that the terminal unit 11 has been activated to generate the initiate communication link or connection command signal.

Figure 4:
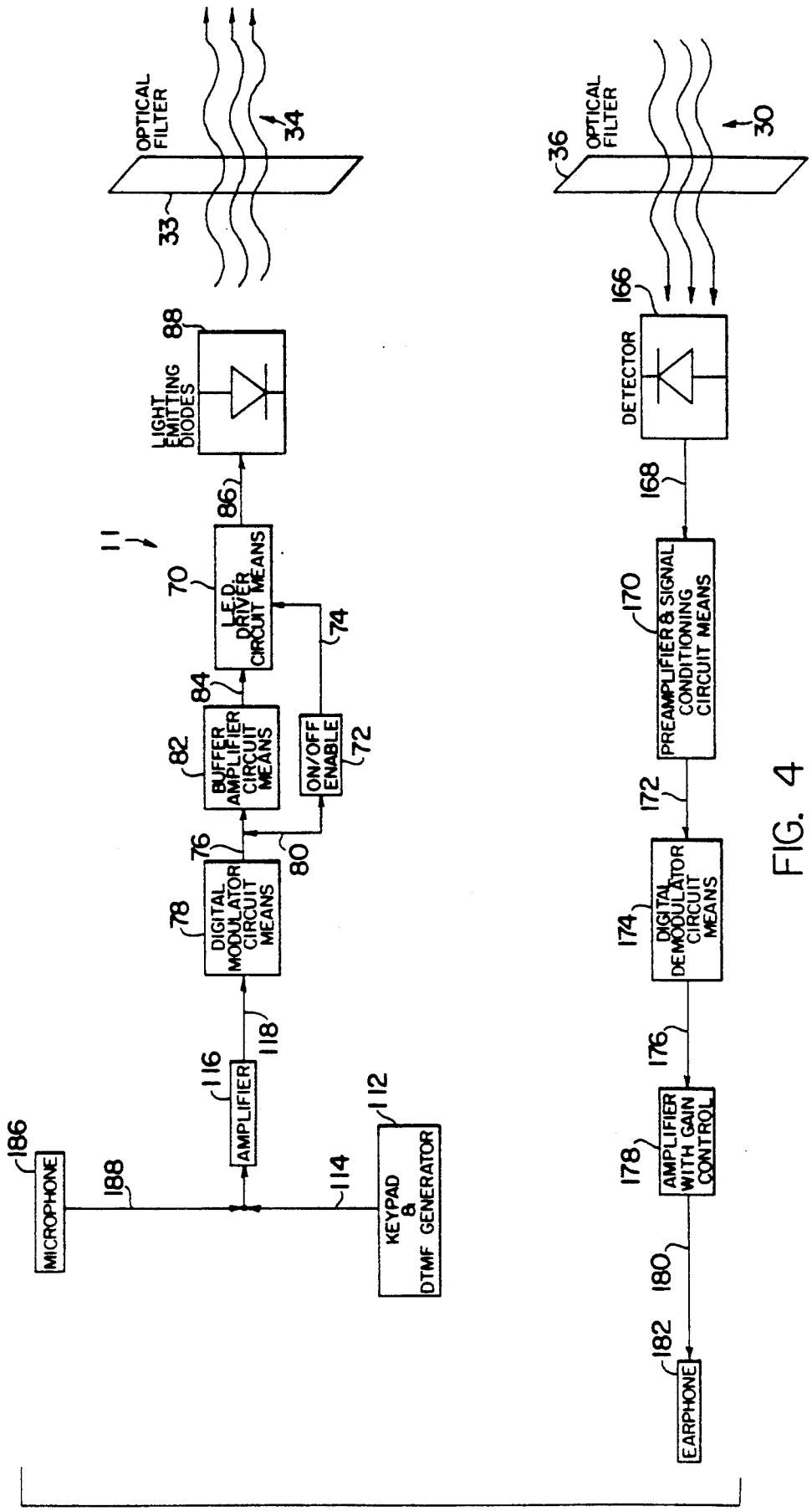
FIG. 4 is a schematic block diagram showing the major functional components of the terminal unit of the present invention.
Figure 5:
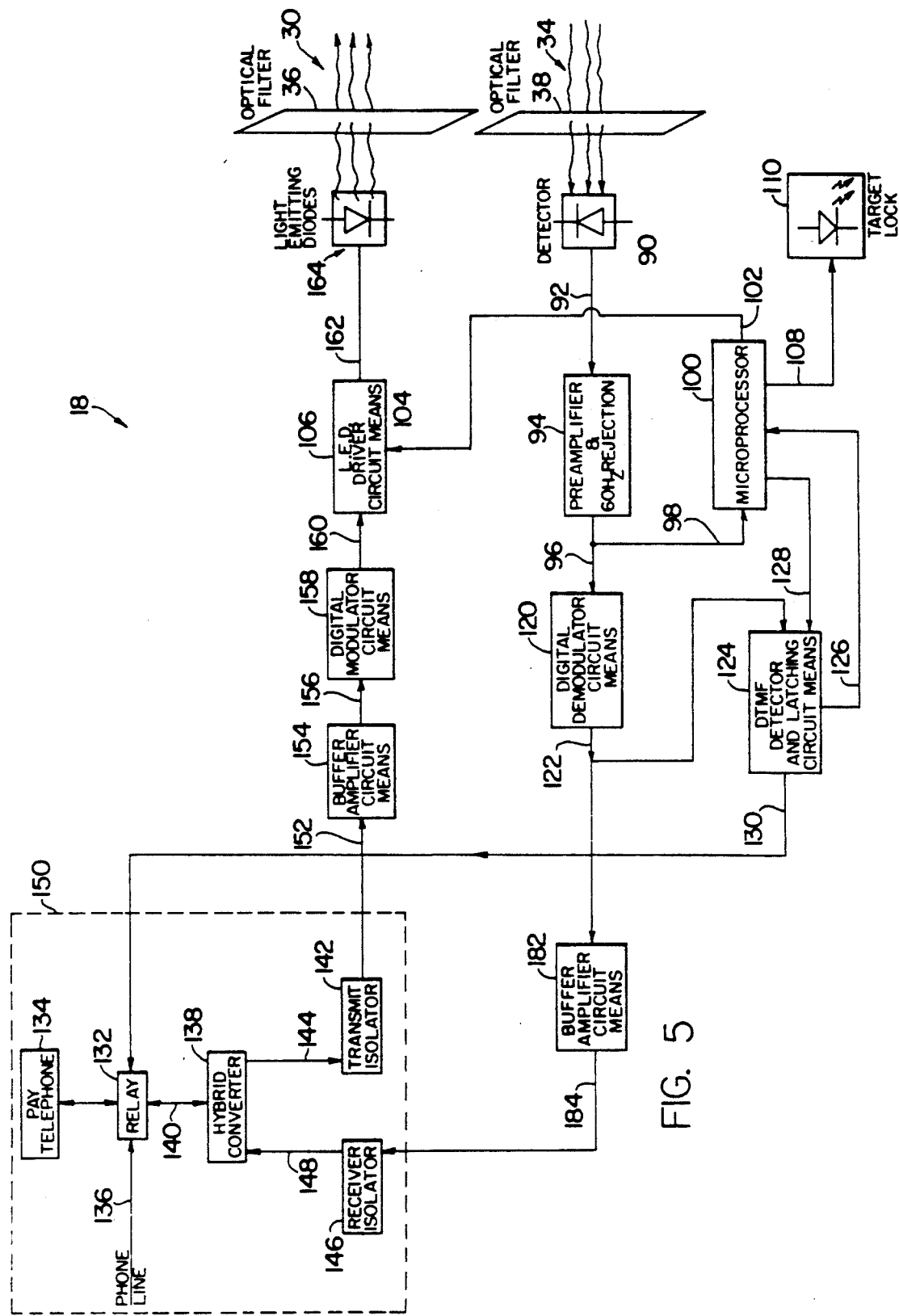
FIG. 5 is a schematic block diagram showing the major functional components of the station unit embodying the present invention.

Turning now to FIGS. 4 and 5, FIG. 4 illustrates in block diagram form the major functional component blocks of the terminal unit 11 and FIG. 5 illustrates in block diagram form the major functional component blocks of the station unit 18 embodying the present invention. Still referring to FIGS. 4 and 5, an optical communication link between the terminal unit and station unit utilizing the digitally formatted optical wave to provide the communication between the terminal unit 11 and the station unit 18 is established as follows. A user generates a request for service by first turning on the handset by operating the ON/OFF switch represented by the ON/OFF enable function block 72 to the ON position to enable the LED driver circuit means designated by the functional block 70 which is coupled to the ON/OFF enable function block 72 via the lead 74. The ON/OFF enable function block 72 is also coupled to the output 76 of a digital modulator circuit means designated by the function block 78 via a lead 80 to enable and disable the output 76. On enablement, the digital modulator circuit means 78 generates the initiate communication link or connection command signal as a 56 kilohertz square wave signal to initiate and maintain the communication link. The 56 kilohertz wave signal is coupled through the buffer amplifier circuit means designated by the function block 82 which has its output 84 coupled to the input of the LED circuit driver means 70. The output 86 of the LED driver circuit means 70 is coupled to one or more light emitting diodes designated by the function block 88 to switch the LEDs on and off at the 56 kilohertz rate to generate the digitally formatted optical wave 34.

The digitally formatted optical wave 34 passes through the optical filter 38 at the station unit 18 and is sensed and detected by a photo diode 90 or other suitable device for receiving and detecting the optical wave being transmitted. The output 92 of the detector 90 is coupled to amplification and rejection electronic circuitry represented generally by the function block 94 to remove AC noise from the received signal and to amplify the signal. The signal is also conditioned to provide digital pulses having sharp leading and trailing edges. The output 96 of the amplification and conditioning circuitry shown in function block 94 is coupled to an input 98 of a microprocessor shown generally in function block 100.

The microprocessor 100 includes an instruction set which senses the frequency of the incoming signal by measuring the time between successive transitions in the signal to determine if the signal is the 56 kilohertz connection command signal. Upon detection of the connection command signal, the microprocessor generates an enable signal at its output 102 which is coupled to an input 104 of an LED driver circuit means shown generally within the function block 106. The microprocessor 100 also has an output 108 connected to an illumination device shown within the function block 110 and which illumination device serves as the "target lock" indication to the user that the alignment between the terminal unit and the station unit is proper and that the connection command signal has been received and detected to complete the handshake sequence. The illumination of the "target lock" indication makes the user aware that the communication link has been established between the terminal unit and the station unit and serves as a prompt to the user to now go "OFF-HOOK". The microprocessor is used to facilitate the circuit operation and provide flexibility and ease to adjust timing and detection parameters; however, the microprocessor basic functions can be duplicated using logic circuit implementation.

Still referring to FIGS. 4 and 5, the user generates an OFF-HOOK supervisory signal by depressing a predetermined key on the keypad generally shown within the function block 112, to generate a dual tone multi-frequency (DTMF) analog signal at its output 114 which is coupled to the input of an amplifier shown within the function block 116. The DTMF signal is coupled from the output 118 of the amplifier 116 to the digital modulator circuit means 78. The DTMF signal appearing at the input to the digital modulator is converted to a series of digital pulses utilizing pulse width modulation (PWM) or continuously variable slope delta (CVSD) modulation encoding techniques. The analog DTMF signal at the input to the digital modulator circuit 78 now appears at the output 76 as a train of digital pulses which are coupled to the LED driver circuit means through the buffer amplifier circuit 82 to drive at least one LED 88 biasing it ON and OFF to cause it to emit a digitally formatted optical wave corresponding to the series of digital pulses at the output 76 of the digital modulator. The digitally formatted optical wave contains encoded in digital format, the analog information representative of the OFF-HOOK DTMF supervisory signal generated.

As in the case of the connection command signal, the digitally formatted optical wave signal is received and detected by the photo diode 90 and amplified and conditioned by the amplification and conditioning circuitry in the function block 94. The output of the amplification and conditioning circuit 96 is coupled to the input of a digital demodulator circuit means generally contained within the function block designated 120. The type of digital demodulator circuit corresponds to the digital modulator circuit utilized in the digital communication protocol being used. That is, the demodulator will be a pulse width demodulator if a pulse width modulator is used, and likewise will be a continuously variable slope delta demodulator if a continuously variable slope delta modulator is used. The digital demodulator circuit 120 processes the digital pulse train input representative of the analog DTMF supervisory signal transmitted and provides an analog replication of the DTMF signal at its output 122. The DTMF signal is coupled to a DTMF detector and latching circuit means illustrated generally by the function block 124 which in turn provides an address signal on lead 126 which is coupled to the microprocessor 100. The instruction set within the microprocessor 100 detects and determines that the signal received is an OFF-HOOK supervisory signal and responds by providing a communication connect command signal on lead 128 which is coupled to the DTMF detector and latching circuit means shown within the function block 124. The output 130 of the DTMF detector and latching circuit 124 in the illustrated embodiment operates a relay 132 which provides connections to the pay telephone instrument 134 and the tip and ring of the telephone line shown as lead 136 and to a two wire-to-four wire hybrid converter circuit 138 via leads 140. The hybrid converter 138 is connected to a transmit isolator circuit 142 via leads 144 and also to a receive isolator circuit 146 via leads 148. The operation of the receive isolator, transmit isolator, hybrid converter, telephone instrument and respective interconnection with the telephone line are well known to those skilled in the art and are shown for exemplary and illustrative purposes within the dashed line box 150. It will also be recognized by those skilled in the art that the dashed line box 150 may be any communication device which transmits and/or receives electrical signals.

Still considering FIGS. 4 and 5, the phone line 136 is coupled upon operation of the relay 132 through the hybrid circuit to the transmit isolator and returns dial tone in the form of an analog electrical signal which is coupled to the input 152 of a buffer amplifier circuit means shown within the function block 154. The output of the amplifier 154 is coupled to the input 156 of a digital modulator circuit means shown within the function block 158. The digital modulator circuit transforms the analog electrical signal at the input 156 to a series of digital pulses at its output 160 which are coupled to the LED driver circuit means 106. The output 162 of the LED driver circuit means 106 is coupled to the input of at least one LED shown generally at 164 to cause the LED to turn on and off in accordance with the pulse train to generate the digitally formatted optical wave 30. The digitally formatted optical wave 30 contains the encoded dial tone frequency electrical signal and is transmitted to the terminal unit 11. The optical wave 30 passes through the optical filter 36 and is sensed and detected by a photo diode 166. The output 168 of the photo diode 166 is coupled to an amplification and signal conditioning circuit means shown generally within the function block 170 which removes analog noise and "squares up" the leading and trailing edges of the digital pulses in the pulse train. The digital signal is coupled from the amplifier and signal conditioning circuit means to the input 172 of a digital demodulator circuit means shown generally within the function block 174 which decodes and transforms the digital pulses into an analog electrical signal which at this stage of the communication is the dial tone signal returned from the public telephone network. The demodulated signal is coupled to the input 176 of an amplifier shown generally within the function block 178 and whose output 180 is coupled to the input of an earphone 182 which transforms the electrical analog signal into an audio signal which is heard by the user. Upon hearing the return of the dial tone signal, a user now dials (taps the keys on the keypad) the desired telephone number via the keypad and DTMF generator within the function block 112. The analog electrical information in the form of the DTMF signals is inputted to the amplifier 116 and is processed through the terminal unit and received by the station unit 18 in the same manner as the supervisory OFF-HOOK signal with the exception that the signal at the digital demodulator circuit means output 122 in the station unit is not sensed by the DTMF detector and latching circuit means but, is coupled to the input of a buffer amplifier circuit means 182 for amplification. The output 184 of the buffer amplifier circuit means 182 is coupled to the input of the receive isolator 146 and to the public telephone network through the phone line 136 via the two wire-to-four wire hybrid converter 138 in the normal manner. Upon connection to the called party, voice or other device, communication is established and processed and returned to the terminal unit in a similar manner as the dial tone signal is returned from the public telephone network as described above. Upon establishing the connection to the public telephone network, credit card, or other calling information is provided as normal. The user now communicates in the normal manner via a microphone 186 which transforms acoustic energy to an electrical signal which is coupled to the amplifier 116 by the lead 188. The electrical analog signal corresponding to the audio signal input, generally voice or data, to the microphone 186 is processed and transmitted to the telephone line 136 in a similar manner as the DTMF generated signals are processed.

The user may terminate a call by transmitting an ON-HOOK supervisory signal to the station unit 18 by depressing a predetermined key on the keypad 112 to generate a corresponding DTMF signal. The DTMF signal is processed and transmitted to the station unit in the same manner as the OFF-HOOK supervisory signal. The ON-HOOK supervisory signal is received and sensed by the DTMF detector and latching circuit means 124 and is outputted on lead 126 to the microprocessor 100. The instruction set in the microprocessor 100 detects the presence of the ON-HOOK supervisory signal and provides an output on the lead 128 causing the DTMF and latching circuit means to release the relay 132 and drop the connection to the telephone line 136. If the user does not wish to proceed with any further calling to the public telephone network, the ON/OFF enable switch shown within the function block 72 is operated to its OFF position which disables the LED driver circuit means to prevent the 56 kilohertz connection command signal whose presence is required to maintain the optical communication link, from being transmitted to the station unit. The absence of the 56 kilohertz connection command signal for a predetermined time interval is detected by the microprocessor 100 which provides a signal on the lead 128 to the DTMF detector and latching circuit means 124 to remove the drive signal from lead 130 causing the relay 132 to drop and disconnect the phone line from the pay telephone and two wire-to-four wire hybrid converter 138 and to return control of access to the tip and ring back to the pay telephone instrument. The station unit circuitry continues to operate for a predetermined time in the absence of the 56 kilohertz connection command signal to accommodate momentary interruptions in the optical communication link between the terminal unit and the station unit as might be the case for example, if a person walks between the terminal and station units momentarily breaking the optical link. After the predetermined time interval, in the present embodiment 3 seconds, the "target lock" drive signal on lead 108 is removed from the LED 110 indicating to the user that the optical communication link has been disconnected. The time interval is adjustable through the instruction set stored in the microprocessor.

Figure 6:
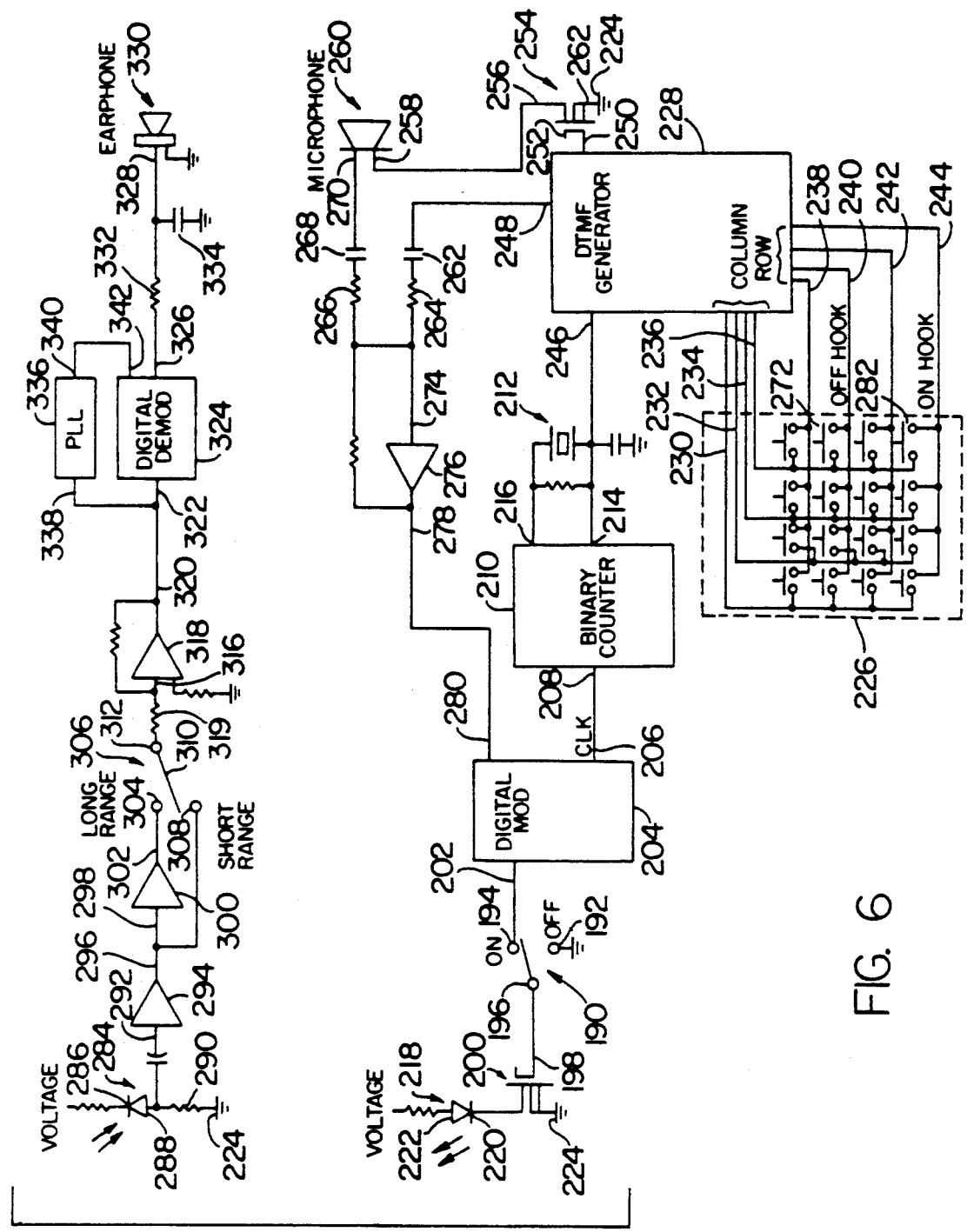
FIG. 6 is an electrical schematic and function block circuit diagram showing one possible implementation of the terminal unit of the present invention.
Figure 7:
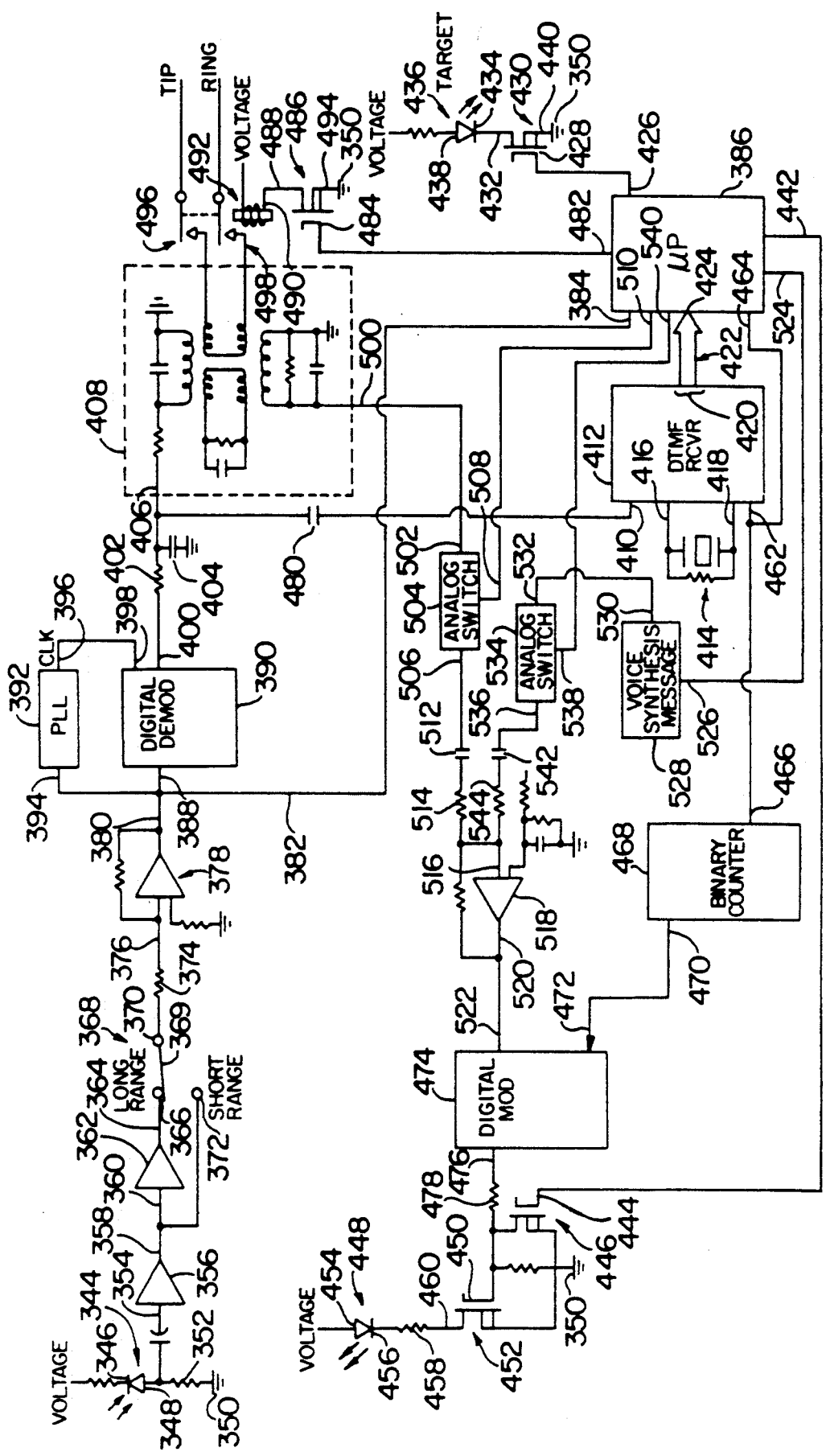
FIG. 7 is an electrical schematic and function block diagram showing one possible implementation the station unit of the present invention.

Turning now to FIGS. 6 and 7, electronic circuit diagrams shown partially in block diagram form are illustrated as one embodiment of the present invention as it might be used to provide an optical communication link with a pay telephone instrument connected to the public telephone network. Referring to FIG. 6, a user initiates the two way optical communication link by operating a switch 190 from its OFF position 192 to its ON position 194. The transfer terminal 196 couples the gate 198 of an FET 200 to the output 202 of a digital modulator circuit represented by the functional block diagram 204. The digital modulator may be, as explained above, implemented using pulse width modulation (PWM) or continuously variable slope delta (CVSD) modulation techniques. One such CVSD integrated circuit is available from Motorola Semiconductor and is designated MC 3418. A 56 kilohertz clock signal is provided to the digital modulator at its clock input 206 which is coupled to the output 208 of a binary input counter 210. The binary counter 210 receives a 3.58 megahertz signal from a crystal oscillator generally designated 212 coupled to the clock input 214,216 of the binary counter 210. Upon operating the switch 190 to the ON position, the FET 200 is biased to enable one or more LED's generally designated 218 having a respective cathode terminal 220 connected to the source terminal of the FET 200. The LED will become conductive and emit light when the FET is biased on to complete the circuit between a voltage potential coupled to the anode 222 of the LED 218 and to ground potential 224 thereby forward biasing the LED. The FET 200 is biased on and off at the 56 kilohertz rate causing the LED 218 to provide a digitally formatted optical wave having an on and off duty cycle of 50% and a frequency of 56 kilohertz.

A standard 4 row by 4 column keypad shown within the dash box 226 corresponds to the keypad on the handset and has its respective columns 1, 2, 3, 4 coupled to the respective column input of a DTMF generator designated by the function block 228 via leads 230, 232, 234, 236 corresponding to the respective columns 1-4. The respective rows 1-4 are connected to the respective row input of the DTMF generator 228 via leads 238, 40, 242, 244 corresponding to rows 1-4 respectively. The crystal oscillator 212 is also coupled to the clock input 246 of the DTMF generator. Upon operation of a key in the keypad 226, one of the respective columns 1-4 is connected to one of the respective rows 1-4 and the intersection causes the DTMF generator 228 to produce a standard DTMF signal at its output 248 and which signal corresponds to a standard pair of tones well known to those skilled in the art.

The DTMF generator 228 also includes a shunting output 250 coupled to the gate 252 of an FET 254. The FET 254 has a source terminal 256 coupled to one end 258 of a microphone 260 associated with the handset and a sink terminal 262 coupled to ground potential 224. During the generation of a multi-frequency signal, the FET 254 is biased to its off state to create an open circuit between the lead 258 of the microphone 260 and the ground potential 224 thereby preventing side tones from being coupled to the handset from the output 248 through the series connection of the capacitor 262, resistor 264, resistor 266, capacitor 268 and input lead 270 connected to the microphone 260.

The ON-HOOK, OFF-HOOK, and other supervisory signals are generated utilizing the combination of the keys in the fourth column intersecting with rows 1-4 of the keypad. In the illustrated embodiment, an OFF-HOOK supervisory signal is generated by depressing the key 272 associated with column 4 and row 2 to cause the DTMF generator to produce the corresponding multi-frequency tone signals at its output 248 which is coupled through the capacitor 262 and resistor 264 to the input 274 of an amplifier 276. The output 278 of the amplifier 276 is coupled to the input 280 of the digital modulator 204 which processes and encodes the analog signal present at its input 280 to digitally formatted electrical pulse signals at its output 202. The digitally formatted electrical pulse signals biases the FET 200 on and off to cause the LED 218 to emit a series of optical pulses having a duration, frequency and timing corresponding to the of the digital pulses appearing at the output lead 202. Likewise, a voice or acoustic signal inputted to the microphone 260 is transformed into an analog electrical signal at the lead 270 and is coupled through the capacitor 268 and resistor 266 to the input 274 of the amplifier 276. The output 278 of the amplifier 276 couples the analog signal representative of the voice or other audio input to the microphone 260 to the input 280 of the digital modulator 204 where it is processed and encoded to provide a series of digital pulses at the output 202. The series of digital pulses at the output 202, representative of the voice or other audio input signal, causes the LED 218 to emit a corresponding series of light pulses which are transmitted to the station unit.

An ON-HOOK supervisory signal is generated in a similar manner as the OFF-HOOK supervisory signal and in the illustrated embodiment, switch 282 is operated to connect column 4 and row 4 causing the DTMF generator 228 to produce a standard multifrequency signal well known to those skilled in the art. The ON-HOOK multi-frequency signal converted to a series of digitally formatted optical pulses in the same manner as the OFF-HOOK supervisory signal.

The terminal unit also includes a photo diode 284 for receiving digital optical pulses transmitted from the station unit, as explained in further detail below, to electrical digital signals. The LED 284 has its cathode 286 coupled to a voltage source and its anode 288 coupled through a resistor 290 to ground potential 224. The digital electrical pulse signals representative of the digital optical pulses are coupled to the input 292 of a signal conditioning amplifier 294. The amplifier 294 may be one or more stages of amplification and signal conditioning to remove AC or other analog noise from the converted optical signal. The output 296 of the last stage of amplification and signal conditioning is coupled to the input 298 of an amplifier 300. The output 302 of the amplifier 300 is coupled to one terminal 304 of a range switch generally designated 306.

The range switch 306 has a second terminal 308 coupled to the input 298 of the amplifier 300. The amplifier 300 is switched in and out of the circuit via the range switch 306 which has its transfer contact 310 coupled to the transfer terminal 312 in series with the output 302 of the amplifier 300. When the transfer contact 310 connects terminals 304 and 312, the distance between the terminal unit and the station unit may be increased. In instances were the distance between the terminal unit and the station unit is relatively short, the range switch 306 is operated to connect the switch terminal 308 to the transfer terminal 312 thereby by-passing the amplifier 300.

The transfer terminal 312 of the range switch 306 is coupled through a resistor 314 to the input 316 of an amplifier 318 configured as a pulse shaping circuit to "square off" the leading and trailing edges of a digital pulse signal at its input. The output 320 of the pulse shaping circuit is coupled to the input 322 of a digital demodulator circuit generally designated 324 which decodes the encoded pulse train received at its input 322 and converts the pulse train to an analog signal at its output 326. The analog signal at the output 326 is coupled through a resistor 332 and shunt capacitor 334 functioning as a low pass filter to the input 328 of an earphone generally designated 330. The earphone 330 converts the electrical signal to an audio signal which is heard by the user.

A phaselock loop circuit represented generally by the function block 336 has its input 338 coupled to the output 320 of the amplifier 318 and the input 322 of the digital demodulator 324. The input 338 also receives the series of digital pulses to derive a synchronous clock signal at its output 340 based on the frequency of the digital pulses present at its input 338. The clock output 340 is coupled to the clock input 342 of the digital demodulator circuit 324 whereby the series of digital pulses present at the input 322 are processed and decoded in accordance with the frequency of the pulse train to replicate the analog signal at its output 326 and which replicated signal has the amplitude and frequency of the corresponding analog signal originating at the station unit as explained below.

Turning to FIG. 7, a digitally formatted optical wave transmitted by the terminal unit to the station unit is sensed and detected by a photo diode generally designated 344 and which photo diode converts the digital optical pulses received to corresponding electrical digital pulse signals. The photo diode 344 has its cathode 346 coupled to a voltage source and has its anode terminal 348 coupled to a ground reference potential 350 through resistor 352. The input circuitry to the station unit for receiving the digitally formatted optical pulses is similar to the circuitry of the terminal unit for receiving digitally formatted optical pulses. The electrical pulses converted by the photo diode 344 are coupled to an input 354 of an amplification and signal conditioning amplifier circuit 356 to remove analog noise and other noise from the received signal. Although the signal conditioning amplifier 356 is shown as one stage, it may be one or more stages. The output 358 of the amplifier 356 is coupled to the input 360 of an amplifier 362 which provides further amplification of a received signal. The output 364 of the amplifier 362 is coupled to one terminal 366 of a range switch generally designated 368 and substantially identical to the range switch in the terminal unit. The range switch 368 has a transfer terminal 370 which is connected to the output 364 of amplifier 362 via the switch terminal 366 when the transfer contact 369 of the range switch is operated to the long range position to permit an increase in distance between the terminal unit and the station unit. The amplifier 362 is by-passed for short distances between the station unit and terminal unit when the transfer terminal 370 of the range switch 368 is connected to the terminal 372 by the transfer contact 369. The transfer terminal 370 is coupled through a resistor 374 to the input 376 of a pulse shaping circuit generally designated 378.

The pulse shaping circuit 378 sharpens up the leading and trailing edges of a digital pulse signal present at the input 376. The output 380 of the pulse shaping circuit 378 is coupled via lead 382 to an input 384 of a microprocessor designated generally by the function block 386. The output 380 of the pulse shaping amplifier circuit 378 is also connected to the input 388 of a digital modulator circuit generally designated by the function block 390. The digital modulator circuit 390 corresponds to the digital transmission scheme being used, that is, in the preferred embodiment pulse width modulation (PWM) or continuously variable slope delta (CVSD) modulation. In the illustrated case, the digital demodulator is of the CVSD type described above and includes a phaselock loop circuit 392 having its input 394 coupled to the output 380 of the pulse shaping circuit 378 to derive a clock signal based on the frequency of the pulses, appearing at the input 394. The clock signal appearing at the output 396 of the phaselock loop circuit is coupled to the clock input 398 of the digital demodulator circuit 390. The output 400 of the digital demodulator circuit 390 is coupled through a resistor 402 and capacitor 404 functioning as a low pass filter to the transmit input 406 of the two wire-to-four wire hybrid converter shown within the dashed line box 408. The analog output signal is also coupled to the input 410 of a dual tone multi-frequency (DTMF) receiver/decoder indicated generally by the function block 412. A 3.58 megahertz crystal clock designated generally 414 is coupled to the clock input 416,418 of the DTMF receiver/decoder 412. The DTMF receiver/decoder 412 converts standard dual tone multi-frequency signals to corresponding digital output signals on address output terminals generally designated 420. Address leads generally designated 422 couple output terminals 420 to corresponding input address terminals generally designated 424 of the microprocessor 386. Upon receiving a connection command signal from the terminal unit when the user operates the switch 190 to the ON position, the 56 kilohertz digitally formatted optical wave is received at the photo diode 344 and is processed and conditioned similarly as a digitally formatted optical wave received at the photo diode 284 in the terminal unit. The digital pulses appearing at the output 380 of the pulse shaping amplifier circuit 378, when the initiate communication link command is activated, correspond to a 56 kilohertz pulse train which is coupled to the timer input capture lead 384 of the microprocessor 386 which recognizes that the signal present at the capture lead 384 is the frequency corresponding to the connection command signal. The microprocessor 386 responds and provides a target lock signal at its output 426 which is coupled to the gate terminal 428 of an FET 430. The source terminal 432 of the FET is coupled to the cathode 434 of an LED 436 which has its anode 438 coupled to a voltage source. The FET 430 has its sink terminal 440 coupled to ground reference potential 350. The capture signal at the output 426 biases the FET 430 to its conductive state which causes the LED to become forward biased and emit light indicating to the user that the optical link connection is established and that the terminal unit and station unit are in proper alignment.

The microprocessor 386 also provides an enable/disable signal at its output 442 which is coupled to the gate terminal 444 of an FET 446 and the LED 448 is disabled by shunting the gate terminal 450 of the FET 452 to ground reference potential 350 through the conductive path formed by the source and the sink terminals of the FET 446. When the FET 446 is made nonconductive by the presence of an enable signal at the gate 444 from the microprocessor 386, the FET 452 is now conditioned to be turned on and off upon application of the proper polarity signal at its gate terminal 450. The LED 448 has its anode 454 coupled to a voltage source and has its cathode 456 coupled through a resistor 458 to the source terminal 460 of the FET 452. The sink terminal of the FET is coupled to ground reference potential 350. The LED 448 will turn on and off to produce the digitally formatted optical signal in accordance with the pulse signals applied to the gate terminal 450 biasing the FET 452 on and off.

The DTMF receiver/decoder 412 also produces a clock signal at its output 462 which is coupled to the clock input terminal 464 of the microprocessor 386 and to the input 466 of a binary counter generally designated by the function block 468. The output 470 of the binary counter 468 is coupled to the input 472 of a digital modulator circuit designated generally by the function block 474. The output clock signal at the lead 470 is a 56 kilohertz 50% duty-cycle pulse train. The signal at the output 476 of the digital demodulator circuit 474 is coupled to the gate terminal 450 of the FET 452 through the resistor 478. The signal at the output 476 is a 56 kilohertz pulse train which causes the LED 448 to emit a series of optical pulses at the 56kilohertz rate. The user may now elect to transmit an OFF-HOOK supervisory signal as described above and which signal is transmitted in a digitally formatted optical signal and received by the photo diode 344 and processed as indicated above. The analog DTMF signal transmitted from the terminal unit is replicated at the digital demodulator output 400 and is coupled to the DTMF receiver/decoder 412 through the resistor 402 and capacitor 480. The DTMF receiver/decoder 412 provides a decoded signal at its address output terminals 420 which are coupled via the address leads 422 to the microprocessor address lead inputs 424. The microprocessor 386 detects the OFF-HOOK supervisory signal and produces a signal at its output 482 which is coupled to a gate terminal 484 of FET 486. The source terminal 488 of the FET 486 is coupled to one end 490 of a relay 492. The sink terminal 494 is coupled to the ground reference potential 350 and when the FET 480 is made conductive, the relay 492 operates causing its respective transfer terminals 496,498 to operate to connect the tip and ring of the telephone line respectively to the two wire input of the two wire-to-four wire hybrid circuit 408.

Dial tone is now received from the central office in the normal manner and is coupled through the two wire-to-four wire hybrid circuit 408 to the receive lead 500. The receive lead 500 is coupled to the input 502 of an analog switch 504 which provides an electrical path from its input 502 to its output 506 when a proper polarity control signal is present at its control input 508. The control input 508 is coupled to a control output 510 of the microprocessor 386 which generates the control signal when the OFF-HOOK supervisory signal is received and recognized. The dial tone signal is coupled through the analog switch 504, through capacitor 512 and resistor 514 to the input 516 of an amplifier 518. The output 520 of the amplifier 518 is coupled to the input 522 of the digital modulator circuit 474. The dial tone signal appearing at the input 522 to the digital modulator 474 is processed and encoded as digital pulses and appear at the output 476 of the digital modulator. The digital pulses are converted and transmitted as a digitally formatted optical signal by the LED 448 as described above. Similarly, analog signals at the terminal unit are processed and converted to a digitally formatted optical signal which is transmitted to the station unit, processed and converted to an analog signal, and sent to the tip and ring of the telephone line connected to the public telephone network via the two wire-to-four wire hybrid circuit. Likewise, analog signals received from the tip and ring of the telephone line network are processed and converted in the station unit and transmitted as a digitally formatted optical signal to the terminal unit where they are processed and decoded to replicate the incoming analog signal.

Upon completion, a user may terminate the call by generating an ON-HOOK supervisory signal from the terminal unit as described above and which supervisory signal is recognized by the microprocessor 386 in a similar manner as is the OFF-HOOK supervisory signal to cause the FET 486 to become non-conductive thereby releasing the relay 492 and opening the tip and ring connection to the two wire-to-four wire hybrid circuit. If a new call is to be made, the user now transmits a new OFF-HOOK supervisory signal to repeat the call process as in any normal telephone communication calling sequence. If the user wishes instead to terminate the call and disconnect the communication link, the switch 190 is operated to its OFF position which inhibits the transmission of the 56 kilohertz optical pulse signal to the station unit. The microprocessor 386 maintains the "target lock" for a predetermined time after the 56 kilohertz signal is interrupted or disconnected after which time a disable signal is generated by the microprocessor at the output 442 to cause the FET 446 to become conductive thereby inhibiting the LED 448.

The present invention also features the capability to provide voice messages or instructions during the calling process. For example, at the time the microprocessor 386 provides a target capture signal at its output 426, it also provides a command signal at its output 524 which is coupled to the input 526 of a voice synthesis message circuit designated generally by the function block 528 to select a message to be transmitted to the user. The output 530 of the voice synthesis message circuit 528 is coupled to the input 532 of an analog switch 534 which upon receipt of a command signal at its control input 538 operates to connect the input 532 to its output 536. The voice synthesis message output 530 is coupled to the input 516 of the amplifier 518 through the analog switch 534, the capacitor 542 and resistor 544. A selected voice synthesis message is processed in the same manner as any analog electrical signal inputted to the amplifier 518 and is transmitted to the terminal unit via a digitally formatted optical signal to provide instructions for operating the terminal, placing a call, prompting instructions, for example, instructions to a user to operate the OFF-HOOK key on the keypad to get dial tone. Similar messages, preprogrammed advertisements, and so forth that are desired to be conveyed to a user may be stored in the voice synthesis message circuit, each of which may be address selectable by the microprocessor output 524 connected to the input 526 to the voice synthesis message circuit 528.

Apparatus for providing a two-way digitally formatted optical communications link has been described above in several preferred embodiments. It will be understood by those skilled in the art that although pulse width modulation and continuously variable slope delta modulation digital transmission protocols are described, the present invention is also operable with any digital baseband modulation scheme. Therefore, the present invention is disclosed by way of illustration rather than limitation.

I claim:

1. Communication apparatus utilizing digital optical signals, said apparatus comprising:
   first input analog circuit means at a first location for receiving an input analog electrical signal;
   first digital circuit means coupled to said input analog circuit means for converting said analog electrical signal to a digital electrical signal;
   first optical transmission circuit means coupled to said first digital circuit means for generating and transmitting a first baseband digitally formatted optical signal;
   enabling circuit means coupled to said first optical transmission circuit means for enabling said first optical transmission circuit means to transmit a connection command signal;
   first optical receiving circuit means located remotely from and in line-of-sight alignment with said first optical transmission circuit means for sensing and receiving said baseband digitally formatted optical signal and for converting said baseband digital formatted optical signal to a digital electrical signal, and
   second digital circuit means coupled to said first optical receiving circuit means for converting said digital electrical signal to an output analog electrical signal, said output analog electrical signal replicating said input analog electrical signal;
   said first digital circuit means further comprising a continuously variable slope delta modulation circuit and said second digital circuit means further comprising a continuously variable slope delta demodulation circuit.

2. Communication apparatus utilizing digital optical signals, said apparatus comprising:
   first input analog circuit means at a first location for receiving an input analog electrical signal;
   first digital circuit means coupled to said input circuit means for converting said analog electrical signal to a digital electrical signal;
   first optical transmission circuit means coupled to said first digital circuit means for generating and transmitting a first baseband digitally formatted optical signal;
   enabling circuit means coupled to said first optical transmission circuit means for enabling said first optical transmission circuit means to transmit a connection command signal;
   first optical receiving circuit means located remotely from and in line-of-sight alignment with said first optical transmission circuit means for sensing and receiving said baseband digitally formatted optical signal and for converting said baseband digital formatted optical signal to a digital electrical signal, and
   second digital circuit means coupled to said first optical receiving circuit means for converting said digital electrical signal to an output analog electrical signal, said output analog electrical signal replicating said input analog electrical signal;
   said first digital circuit means further comprising a pulse-width-modulation modulator and said second digital circuit means further comprising a pulse-width-modulation demodulator.

3. Communication apparatus as defined in claim 1 or 2 further including:
   second input circuit means for receiving a second input analog electric signal;
   third digital circuit means coupled to said second input circuit means for converting said second input analog electrical signal to an encoded digital electrical signal, said third digital circuit means having an output coupled to said second optical transmission circuit means, said second optical transmission circuit means being responsive to said digital electrical signal to transmit a second baseband digitally formatted optical signal representative of said encoded digital electrical signal, and
   fourth digital circuit means coupled to said second optical receiving circuit means for decoding said encoded digital electrical signal and for converting said digital electrical signal to an analog electrical signal.

4. Communication apparatus as defined in claim 3 further including:
   signalling circuit means coupled to said input circuit means for generating one or more unique control signals for use by said microprocessor to control said communication apparatus, and
   control signal circuit recognition means coupled to said second digital circuit means and to said microprocessor circuit means for sensing said one or more unique control signals, said microprocessor producing an output control command signal in response to and corresponding to said unique control signal generated at said signalling circuit means.

5. Communication apparatus as defined in claim 4 wherein said signalling circuit means comprises a dual tone multi-frequency (DTMF) generator and said control signal circuit recognition means comprises a DTMF receiver and decoder.

6. Communication apparatus as defined in claim 3 wherein said first and second baseband digitally formatted optical signals are infrared optical signals.

7. Communication apparatus utilizing digital optical signals, said apparatus comprising:

first input analog circuit means for receiving an input analog electrical signal;

first digital circuit means coupled to said input circuit means for converting said analog electrical signal to a digital electrical signal;

first optical transmission circuit means coupled to said first digital circuit means for generating and transmitting a first baseband digitally formatted optical signal;

first optical receiving circuit means located remotely from and in line-of-sight alignment with said first optical transmission circuit means for sensing and receiving said baseband digitally formatted optical signal and for converting said baseband digital formatted optical signal to a digital electrical signal, and second digital circuit means coupled to said first optical receiving circuit means for converting said digital electrical signal to an output analog electrical signal, said output analog electrical signal replicating said input analog electrical signal;

enabling circuit means coupled to said first optical transmission circuit means for enabling said first optical transmission circuit means to transmit a connection command signal;

microprocessor circuit means coupled to said first optical receiving circuit means for sensing and responding to said connection command signal to generate an enable command signal;

second optical transmission circuit means coupled to said microprocessor circuit means for receiving said enable command signal in response to said microprocessor sensing said connection command signal to enable said second optical transmission circuit means to transmit a digitally formatted optical signal acknowledging said connection command signal, and second optical receiving circuit means located in the vicinity of said first optical transmission circuit means and remotely from and in line-of-sight alignment with said second optical transmission circuit for receiving said digitally formatted optical signal carrying said acknowledgement response signal to said connection command signal whereby a two-way optical communication link between said first optical transmission circuit means and said first optical receiving circuit means and said second optical receiving circuit means is established.

8. Communication apparatus as defined in claim 7 further including target lock signalling means coupled to said microprocessor circuit means for providing an indication that said optical communication link is established and that said first optical transmission circuit means is in line-of-sight alignment with said first optical receiving circuit means.

9. Communication apparatus utilizing infrared digital optical signals for establishing a bidirectional optical communication path between a first and second location remote from one another, said apparatus comprising:

a terminal unit at the first location, said terminal unit including:

means for receiving a first analog electrical signal;

means coupled to said first analog receiving means for converting said first analog electrical signal to a first baseband digitally formatted optical signal;

first means for transmitting said first baseband digitally formatted optical signal;

first means for enabling said first transmitting means to transmit a first connection command signal;

a station unit at the second location, said station unit including:

means for receiving said first baseband digitally formatted optical signal;

means coupled to said first optical receiving means for converting said received first baseband digitally formatted optical signal into a second analog electrical signal, said second analog electrical signal replicating said first analog electrical signal;

means for receiving a third analog electrical signal;

means coupled to said third analog receiving means for converting said third analog electrical signal to a second baseband digitally formatted optical signal;

second means for transmitting said second baseband digitally formatted optical signal second means for enabling said second transmitting means to transmit a second connection command signal;

said terminal unit further including:

means for receiving said second baseband digitally formatted optical signal;

means coupled to said second optical receiving means for converting said received second baseband digitally formatted optical signal into a fourth analog electrical signal, said fourth analog electrical signal replicating said third analog electrical signal to establish a two-way communication connection between the first and second locations via the bi-directional optical communication path.

10. Communication apparatus utilizing infrared digital optical signals as defined in claim 9 wherein said means for converting said first analog electrical signal and said means for converting said third analog electrical signal comprise a digital modulator, and said means for converting said received first baseband digitally formatted optical signal and said means for converting said received second baseband digitally formatted optical signal comprise a digital demodulator.

11. Communication apparatus utilizing infrared digital optical signals as defined in claim 10 wherein said digital modulator and said digital demodulator comprise a continuously variable slope delta (CVSD) modulator and demodulator, respectively.

12. Communication apparatus utilizing infrared digital optical signals as defined in claim 10 wherein said digital modulator and said digital demodulator comprise a pulse width modulation (PWM) modulator and demodulator, respectively.

13. Communication apparatus utilizing infrared digital optical signals as defined in claim 10 further including:

said means for converting said first baseband digitally formatted optical signal comprising:

a first photo detector for converting said infrared digital optical signals to corresponding digital electrical signals;

at least one stage of first amplification circuit means coupled to said photo detector for amplifying said corresponding digital electrical signals;

first switchable amplification circuit means having an input coupled to said at least one stage of amplification circuit means;

first switching circuit means coupled to said first switchable amplification circuit means and having two operative states, said first operative state for bypassing said first switchable amplification circuit means and corresponding to said apparatus operating at a SHORT distance between said first and second locations and said second operative state for coupling said first switchable amplification circuit means to said digital demodulator and corresponding to said apparatus operating at a LONG distance between said first and second locations;

said means for converting said second baseband digitally formatted optical signal comprising:

a second photo detector for converting said infrared digital optical signals to corresponding digital electrical signals;

at least one stage of second amplification circuit means coupled to said second photo detector for amplifying said corresponding digital electrical signals;

second switchable amplification circuit means having an input coupled to said at least one stage of second amplification circuit means;

second switching circuit means coupled to said second switchable amplification circuit means and having two operative states, said first operative state for bypassing said second switchable amplification circuit means and corresponding to said apparatus operating at said SHORT distance and said second operative state for coupling said second switchable amplification circuit means to said second digital demodulator and corresponding to said apparatus operating at said LONG distance between said first and second locations.

14. Communication apparatus utilizing infrared digital optical signals as defined in claim 13 further including:

said means for transmitting said first baseband digitally formatted optical signal comprising first LED circuit means, and said means for transmitting said second baseband digitally formatted optical signal comprising second LED circuit means.

15. Communication apparatus utilizing infrared digital optical signals as defined in claim 14 further including said digitally formatted optical signal being transmitted at a predetermined frequency, said predetermined frequency corresponding to a connection command signal, said communication command signal being sensed by said means for converting said first baseband digitally formatted optical signal to maintain said optical communication path.

16. Communication apparatus utilizing infrared digital optical signals as defined in claim 15 further comprising said means for converting said first baseband digitally formatted optical signal including logic circuit means for sensing said communication command signal.

17. Communication apparatus utilizing infrared digital optical signals as defined in claim 16 wherein said logic circuit means comprises a microprocessor having an instruction set for sensing and detecting said communication command signal to enable said second LED circuit means.

18. In combination with a telephone instrument of the general type arranged to accept coin, credit card and the like for accessing connection to the public telephone switching network, apparatus for establishing a bi-directional optical communication path between a user and the telephone switching network, said apparatus comprising:

a station unit;

a terminal unit located remotely from said station unit;

said station unit having circuit means for electrically interfacing a telephone line associated with the public telephone switching network and the telephone instrument to electrically and physically couple the telephone line to the telephone instrument, said station unit having first and second operative states, said first state corresponding to the telephone line being electrically connected to the telephone instrument in the normal manner and said second state corresponding to the telephone line being electrically connected said station unit circuit means;

said terminal unit having means for optically coupling said terminal unit to said station unit, said terminal unit further comprising:

microphone means for sensing audio frequency signals and for converting said audio signals to baseband frequency electrical signals, said microphone means having an output;

receiver earpiece means for sensing baseband frequency electrical signals carrying information in the audio frequency spectrum to convert said sensed electrical signals to sound for hearing by a user;

a key pad having circuit means for generating dual tone multi-frequency (DTMF) signals at an output to dial a telephone number;

supervisory circuit means for generating a baseband frequency supervisory signal representative of an "off-hook" condition for initiating a call connection with said station unit, said supervisory signal being used for sustaining said optical coupling between said station unit and said terminal unit;

digital modulation circuit means for converting said baseband frequency supervisory signals and said baseband frequency audio signals to digitally modulated electrical signals;

optical circuit means coupled to said digital modulation circuit means for converting said digitally modulated electrical signals into digitally modulated optical signals for transmission to said station unit;

optical receiving means for sensing optical signals and for converting said sensed optical signals into digitally modulated electrical signals representative of supervisory and audio frequency signals originating at said station unit;

first digital demodulation circuit means for converting said digitally modulated electrical signals into supervisory and audio baseband frequency signals;

said station unit means including:

optical detecting means for receiving a digitally modulated optical signal from said terminal unit to transform said optical signal to a corresponding digitally modulated electrical signal;

second digital demodulation circuit means for converting said digitally modulated electrical signal into supervisory and audio baseband frequency signals;

circuit means response to an "off-hook" supervisory signal for causing said station unit to operate to its second operative state and for coupling baseband frequency electrical signals appearing on the telephone line to said second digital modulation circuit means for converting said baseband frequency signals to digitally modulated electrical signals;

optical transmission circuit means for converting said digitally modulated electrical signals to digitally modulated optical signals for transmission to said terminal unit, whereby audio frequency signals appearing on said telephone line are received at the earpiece of said terminal unit and audio frequency signals at the microphone of said terminal unit are received at said telephone line.

19. Apparatus as defined in claim 18 wherein said digital modulation circuit means and said digital demodulation circuit means process pulse-width-modulated (PWM) electrical signals.

20. Apparatus as defined in claim 19 wherein said digital modulation circuit means and said digital demodulation circuit means process continuous variable slope delta (CVSD) modulated electrical signals.

21. Communication apparatus utilizing digital optical signals, said apparatus comprising:
   first input circuit means for receiving an input analog electrical signal;
   first digital circuit means coupled to said input circuit means for converting said analog electrical signal to a digital electrical signal;
   first optical transmission circuit means coupled to said first digital circuit means for generating and transmitting a first baseband digitally formatted optical signal;
   enabling circuit means coupled to said first optical transmission circuit means for enabling said first optical transmission circuit means to transmit a connection command signal;
   first optical receiving circuit means located remotely from and in line-of-sight alignment with said first optical transmission circuit means for sensing and receiving said baseband digitally formatted optical signal and for converting said baseband digital formatted optical signal to a digital electrical signal, and
   second digital circuit means coupled to said first optical receiving circuit means for converting said digital electrical signal to an output analog electrical signal, said output analog electrical signal replicating said input analog electrical signal;

22. A communication method utilizing digital optical signals, said method comprising the steps of:
   receiving a first analog electrical signal at a first location;
   converting said first analog electrical signal to a first baseband digitally formatted optical signal;
   transmitting said first baseband digitally formatted optical signal;
   receiving said first baseband digitally formatted optical signal at a second location remote from said first location,
   converting said received first baseband digitally formatted optical signal into a second analog electrical signal, said second analog electrical signal replicating said first analog electrical signal;
   the step of converting said first analog electrical signal further including processing said first analog electrical signal utilizing a continuously variable slope delta (CVSD) modulation encoder and digitally encoding said first analog electrical signal at a predetermined frequency, and
   the step of receiving said first baseband digitally formatted optical signal including sensing said transmitted first baseband digitally formatted signal at said predetermined frequency thereby establishing an optical communication link between the first and second location when said digitally formatted signal is sensed at said predetermined frequency at the second location and dropping said optical communication link when said digitally formatted signal is not sensed at said predetermined frequency at the second location.

23. A communication method utilizing digital optical signals, said method comprising the steps of:
   receiving a first analog electrical signal at a first location;
   converting said first analog electrical signal to a first baseband digitally formatted optical signal;
   transmitting said first baseband digitally formatted optical signal;
   receiving said first baseband digitally formatted optical signal at a second location remote from said first location,
   converting said received first baseband digitally formatted optical signal into a second analog electrical signal, said second analog electrical signal replicating said first analog electrical signal;
   the step of converting said first analog electrical signal further including processing said first analog electrical signal utilizing a pulse-width-modulation (PWM) encoder and digitally encoding said first analog electrical signal at a predetermined frequency, and
   the step of receiving said first baseband digitally formatted optical signal including sensing said transmitted first baseband digitally formatted signal at said predetermined frequency thereby establishing an optical communication link between the first and second location when said digitally formatted signal is sensed at said predetermined frequency at the second location and dropping said optical communication link when said digitally formatted signal is not sensed at said predetermined frequency at the second location.

24. A communication method as defined in claim 22 wherein the step of converting said received first baseband digitally formatted optical signal includes processing said received optical signal utilizing a continuously variable slope delta (CVSD) modulation decoder.

25. A communication method as defined in claim 23 wherein the step of converting said received first baseband digitally formatted optical signal includes processing said received optical signal utilizing a pulse-width-modulation (PWM) decoder.

26. A communication method as defined in claim 22 or 23 further including the steps of:
   receiving a third analog electrical signal at the second location;
   converting said third analog electrical signal to a second baseband digitally formatted optical signal;

transmitting said second baseband digitally formatted optical signal;

receiving said second baseband digitally formatted optical signal at the said first location, and converting said received second baseband digitally formatted signal into a fourth analog electrical signal, said fourth analog electrical signal replicating said third analog electrical signal to establish a bi-directional digital optical communication link between the first and second locations.

27. A communication method as defined in claim 26 wherein the steps of converting said first and second analog electrical signals to first and second baseband digitally formatted optical signals, respectively include the step of converting said first and second analog electrically signals to digitally formatted infrared optical signals.

* * * * *

UNITED STATES PATENT AND TRADEMARK OFFICE
CERTIFICATE OF CORRECTION

PATENT NO. : 5,315,645
DATED : May 24, 1994
INVENTOR(S) : Mark Matheny

It is certified that error appears in the above-identified patent and that said Letters Patent is hereby corrected as shown below:

COLUMN 17

Line 24, please delete "and";

Line 55, after "means", please insert -- and between said second optical transmission circuit means--.

Signed and Sealed this

Thirtieth Day of August, 1994

Attest:

BRUCE LEHMAN

Attesting Officer

Commissioner of Patents and Trademarks